United States Patent [19]
Barriger et al.

[11] Patent Number: 6,007,029
[45] Date of Patent: Dec. 28, 1999

[54] BOILER TUBE ALIGNMENT LINK SYSTEM

[75] Inventors: Alan P. Barriger, Caro, Mich.; Rickey E. Wark, The Woodlands, Tex.

[73] Assignee: ASTECH, Inc., Vassar, Mich.

[21] Appl. No.: 09/089,268

[22] Filed: Jun. 3, 1998

[51] Int. Cl.⁶ ...................................................... F16L 3/22
[52] U.S. Cl. ......................................... 248/68.1; 165/172
[58] Field of Search .............................. 248/68.1, 49, 65, 248/74.1; 165/172

[56] References Cited

U.S. PATENT DOCUMENTS

| | | | |
|---|---|---|---|
| 3,856,244 | 12/1974 | Menshen | 248/68.1 |
| 4,030,540 | 6/1977 | Roma | 248/68.1 X |
| 5,794,897 | 8/1998 | Jobin et al. | 248/68.1 X |

*Primary Examiner*—Ramon O. Ramirez
*Attorney, Agent, or Firm*—Young & Basile, P.C.

[57] ABSTRACT

A system for linking adjacent cuff sets for boiler tubes in parallel. A pair of contoured, plate-like adapter links is shaped to fit over the endmost cuff portions of two endwise mated cuff sets, and then secured to the endwise mated cuff sets to hold them in parallel. In a preferred form the adapter links are radially connected by a male throughpiece such as a bolt or bar extending through a keyway formed integrally in the end faces of the mated cuff sets. In a further preferred form, the end cuff portions of the mated cuff sets include welding tangs adapted to fit into welding slots formed in the adapter links so that the adapter links can be welded to the tangs, thereby locking the mated cuff sets together in a lengthwise direction.

8 Claims, 5 Drawing Sheets

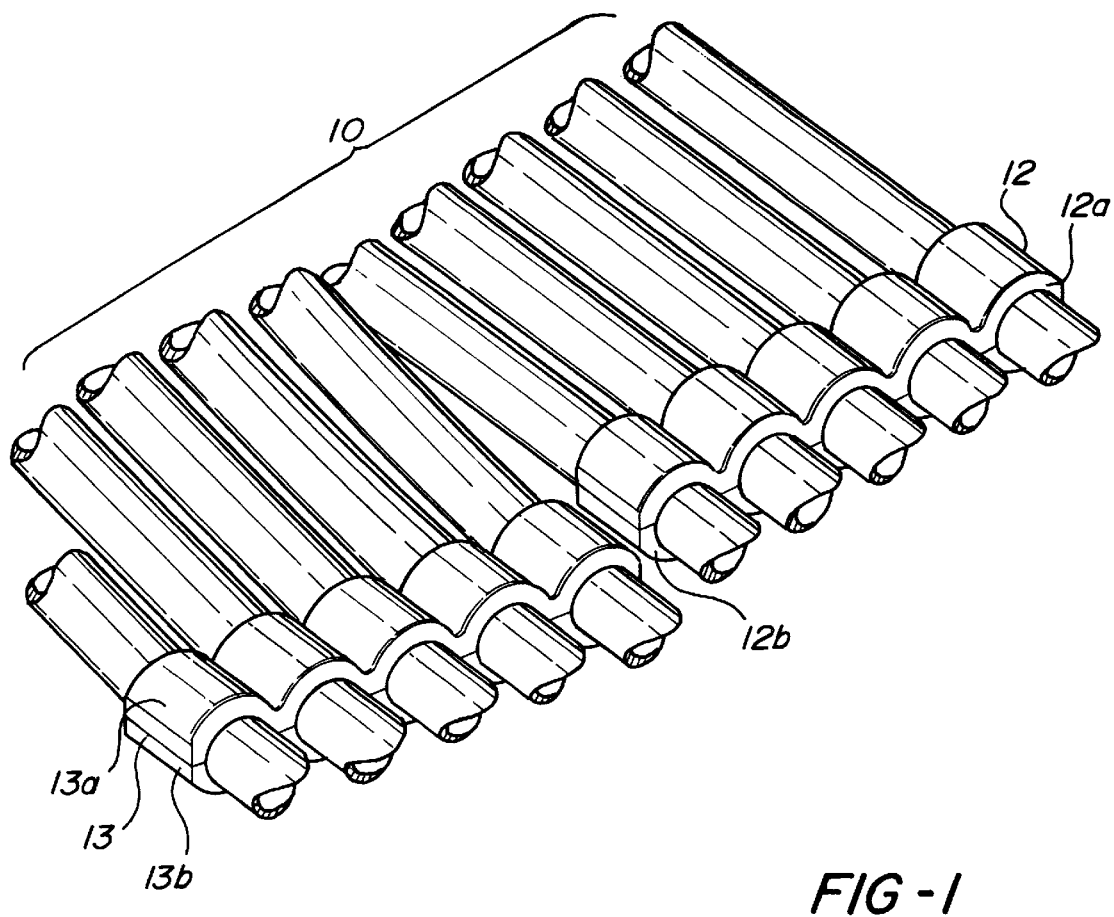
FIG-1
PRIOR ART
FIG-2
PRIOR ART
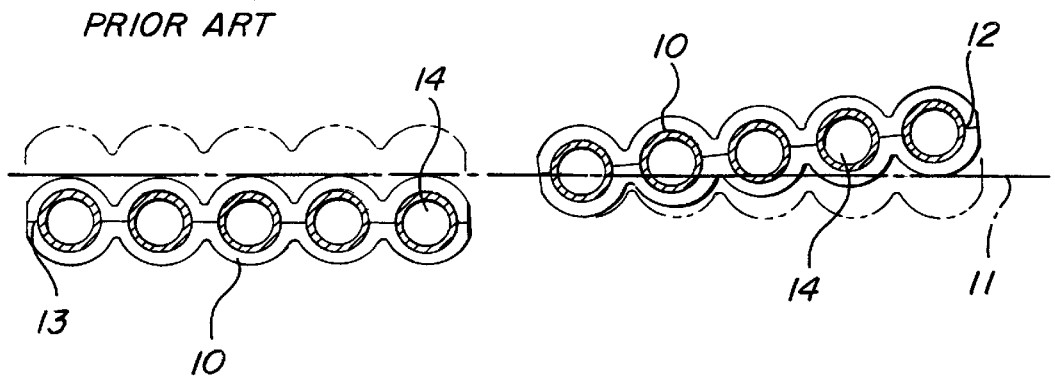

BOILER TUBE ALIGNMENT LINK SYSTEM

FIELD OF THE INVENTION

The present invention is in the field of boiler tube cuffs used to align boiler tubes in power-generating plants.

BACKGROUND OF THE INVENTION

Typical boiler tube arrays of the type used to transfer heat from a combustion chamber to a fluid driving a power-generating device in an industrial power plant may include as many as a hundred boiler tubes in a single, ideally parallel array. Because the long, relatively thin-walled tubes are subjected to significant heat stress, they tend to warp and shift out of parallel alignment, reducing the uniformity and efficiency of heat transfer to the fluid in the tubes.

The industry standard for keeping the tubes in proper alignment is a boiler tube cuff, comprising an elongated set of mating handcuff-like castings with semi-circular cuff portions designed to be radially mated over a set of boiler tubes. After being placed over a set of tubes in the array, the mating halves of a cuff set are secured to one another with known structure such as weldable posts or threaded bolts. The warping and misalignment of the tubes typically requires the tubes to be pre-clamped in parallel before the cuffs can be mated over them.

Most boiler tube cuffs come in lengths capable of holding five or six tubes at a time. However, each set of five or so cuffed tubes is prone to distortion and misalignment relative to adjacent sets of cuffed tubes, partially defeating the alignment purpose of the cuffs. Occasionally, a cuff set will be produced with as many as twelve or fifteen "holes", but this is considered an extreme length in the industry, and is impractical for most applications because it is too costly to make a longer mold.

SUMMARY OF THE INVENTION

The present invention generally solves the foregoing problem of short cuff sets with a novel linking structure. The end of each cuff set is provided with a notch or slot formed in the end wall, for example during the casting process. When two such notched sets of cuffs are mated end to end, the mating notches define a bore or keyway adapted to receive a bar or bolt. Each end of the bar or bolt is then connected to an adapter link shaped to conform to at least a portion of the outer surfaces of the mating cuff ends, and the ends of the bar or bolt are then secured to the adapter links to connect the cuff sets.

In a first embodiment of the invention, a male adapter link is provided with an integral bar or prong adapted to be inserted through one end of the keyway formed between two notched cuff set ends, and mated with a female adapter link conforming itself to the outer surfaces of the cuff ends on the opposite side of the endwise-mated cuff sets. The female adapter is then welded to the end of the rectangular bar to lock the mated sets of cuffs together.

In a second embodiment of the invention, both adapter links are female, and the male bar is a separate piece, for example a through-bolt, inserted from one side of the mated cuff sets through both adapter links and then fastened to the links with a nut, for example.

In still a further form of the invention, the mating ends of the cuff sets include short weldable tangs or posts integrally cast onto the exterior of each endmost cuff, and the adapter links are provided with slots or cutouts to fit over and be welded to these tangs to improve the locking connection between the adapter links and the mated cuff set ends. Alternately, it is possible to form a welding slot or cutout in the adapter links, but leave the tangs off the cuffs, and to secure the adapter links to the outside contour of the cuff ends with a plug weld through the slot or cutout.

These and other features and advantages of the present invention will become apparent upon further reading of the specification, in light of the accompanying drawings.

BRIEF DESCRIPTION OF THE DRAWINGS

FIGS. 1 and 2 are perspective and sectional plan views, respectively, of a boiler tube array showing a prior art arrangement of two unlinked sets of five-hole cuffs and the misalignment thatch can occur between adjacent cuffed sets of boiler tubes;

DETAILED DESCRIPTION OF THE ILLUSTRATED EMBODIMENTS

Figure 3:
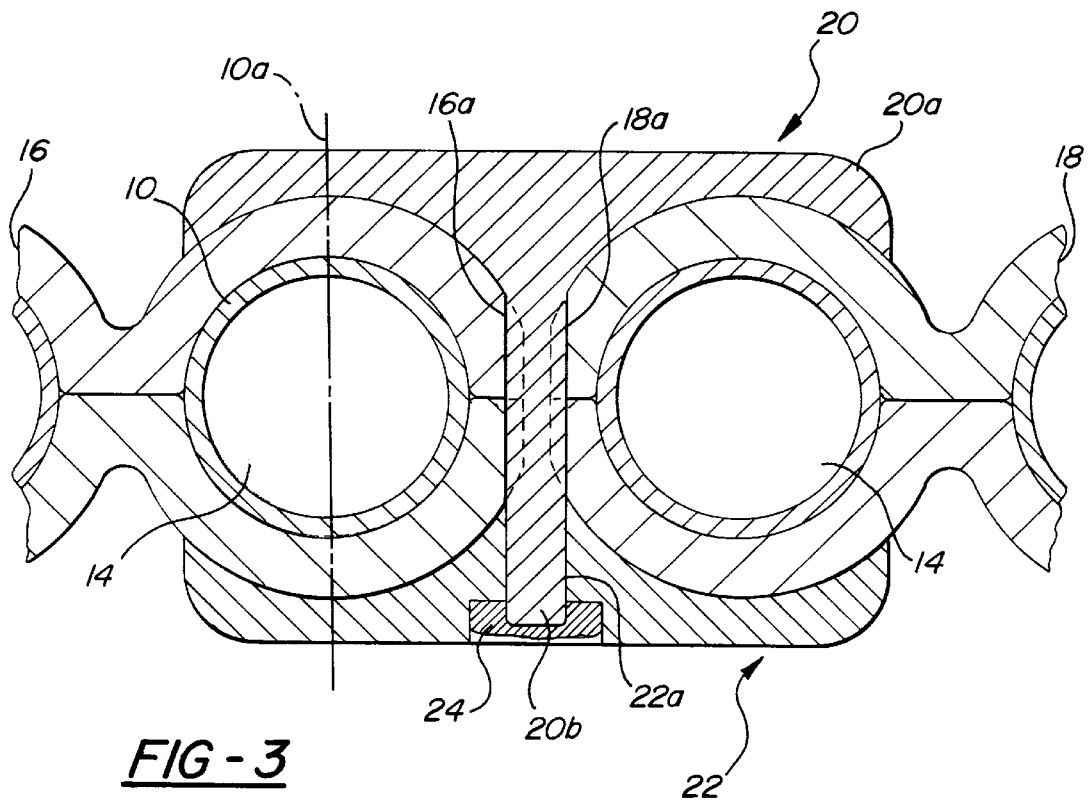
FIG. 3 illustrates the endmost cuff portions of two boiler tube cuff sets, linked by a first embodiment of the present invention using male and female adapter links.

FIGS. 1 and 2 illustrate a prior art arrangement for linking boiler tubes 10 with standard cuff sets 12 and 13 of a conventional type. In the illustrated embodiment of FIGS. 1 and 2, cuff sets 12 and 13 each comprise five-hole sets of mated upper and lower halves 12a, 12b and 13a, 13b, which halves are radially mated to one another over their respective sets of five boiler tubes by known techniques such as welding or bolting.

FIGS. 1 and 2 show the tendency of the independently-linked sets of five boiler tubes to shift relative to one another in the harsh environment of a combustion chamber. For example, FIG. 1 illustrates in exaggerated fashion the tendency of tubes 10 to bend or warp, thereby displacing the tubes linked by cuff set 13 from those linked by cuff set 12. FIG. 2 illustrates in exaggerated fashion the misalignment of independently-linked cuff sets 12 and 13 from an ideal parallel alignment designated by centerline 11.

Referring next to FIG. 3, a first embodiment of a device according to the present invention for linking separate cuff sets into a solid, properly aligned array is illustrated in partial section view. Initially, boiler tubes 10 are cuffed together by two separate cuff sets 16, 18 similar to sets 12, 13 shown in FIGS. 1 and 2, except that keyways 16a, 18a are formed in their end faces. In the illustrated embodiment of FIG. 3, keyways 16a, 18a are matching, open-faced rectangular channels formed in the abutting end faces of the cuff sets, for example during the casting process. The keyways may also be machined into existing cuff sets such as 12 and 13 shown in FIG. 1 in order to retrofit old cuffs with the new invention. The plan view of FIG. 5B best shows illustrated keyways 16a, 18a.

Cuff sets 16 and 18 are linked via the keyway formed between them by a connection between male adapter link 20 and female adapter link 22. In the embodiment shown in FIG. 3, male adapter link 20 comprises a contoured plate portion 20a which conforms itself to the outer surfaces of the mating ends of the cuff sets, and an integral rectangular bar or prong 20b extending from plate portion 20a through the keyway to female adapter link 22 on the opposite side of the cuffed boiler tubes. Female adapter link 22 comprises a contoured plate portion similar to the male adapter link, except that a hole 22a is formed therein to receive the end of male bar 20b. Once adapter links 20 and 22 are positioned as shown, the two adapter links are locked to each other by securing the protruding end of male bar 20b to the female adapter link, for example by weld 24.

It will be apparent to those skilled in the art that while a welded arrangement as shown in FIG. 3 is preferred, it is also possible to provide a circular thread on the protruding end of male bar 20b to which a nut could be secured and then tightened against female adapter link 22 to lock the two adapter links and the cuffed boiler tube sets 16, 18 together. It will also be apparent to those skilled in the art that while a rectangular keyway and bar arrangement is illustrated, round keyways and bars are possible alternatives.

Another feature of the invention shown in FIG. 3 is the preferred minimum extent to which the contoured plate portions of the male and female adapter links extend around the circumference of the end cuffs on cuff sets 16 and 18, i.e. at least to and preferably beyond the "halfway point" of the semi-circular end cuff portion with which the end of each contoured plate is associated. This halfway point is schematically illustrated in FIG. 3 by the dotted line labeled 10a extending through the center of the boiler tube and its associated cuff. The contour fit of the adapter links around the circumference of the cuffs provides a longitudinal holding force on the cuff sets in addition to the radial connection established by the male bar or bolt.

Figure 4:
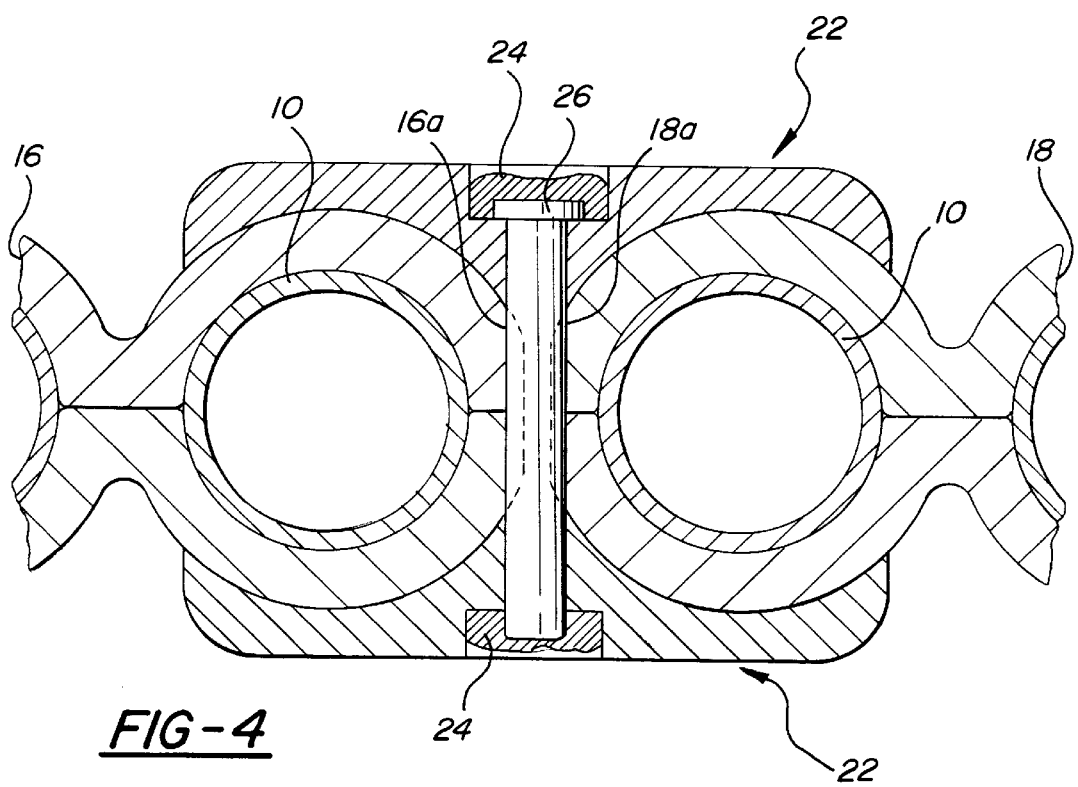
FIG. 4 illustrates an alternate embodiment of the invention, in which two female adapter links are connected by a separate throughbolt connected at both ends to the female adapter links.

Referring next to FIG. 4, an alternate embodiment of the present invention is shown comprising two identical female adapter links 22 joined by a separate male throughbolt or bar 26, which is welded at each of its protruding ends to a respective female adapter link 22 by welds 24.

Figure 5:
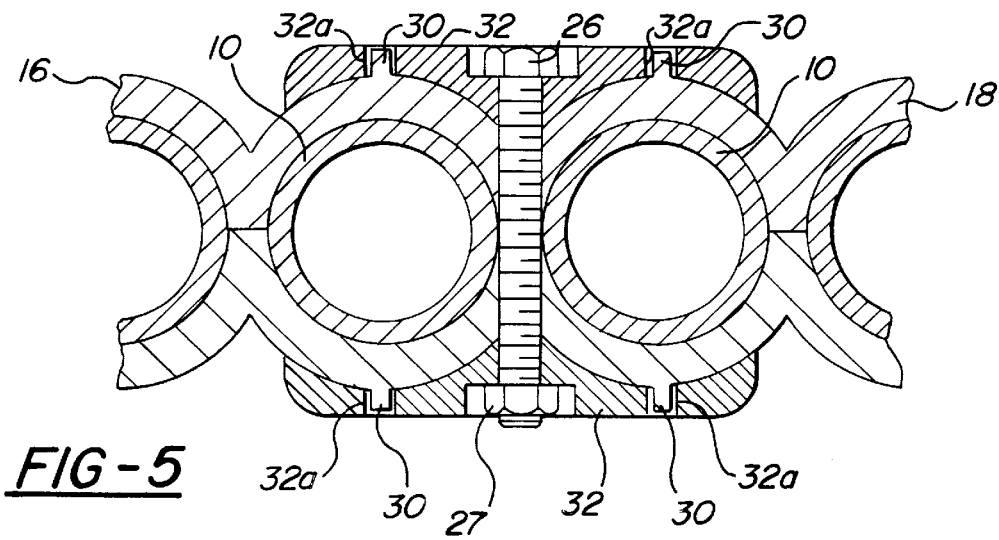
FIG. 5 illustrates another embodiment of the invention in which the adapter links are provided with slots or cutouts through which a welded connection is made to a cast tang or post formed on the end cuffs of two adjacent cuff sets.
Figure 5A:
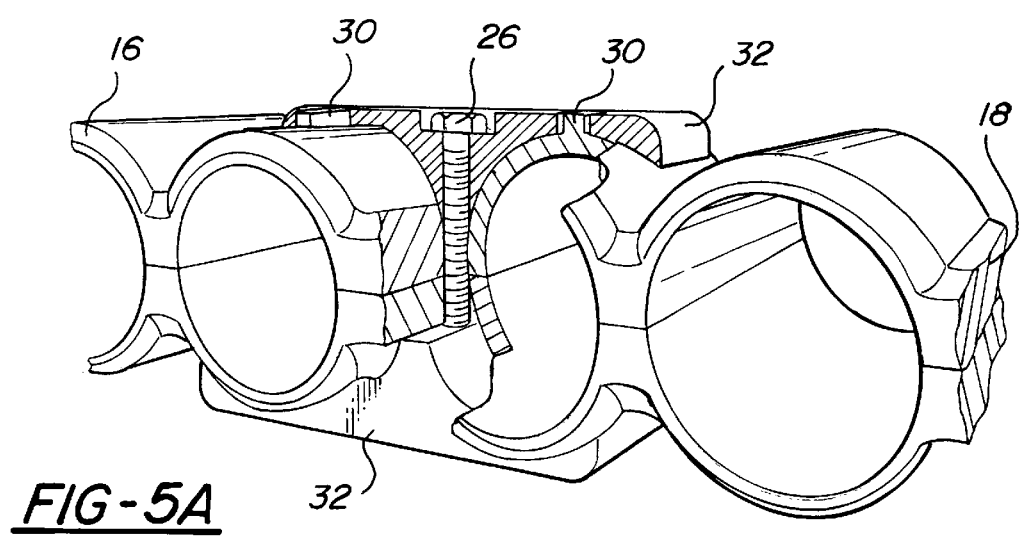
FIGS. 5A and 5B are a sectioned perspective view and a plan view, respectively, of the embodiment of FIG. 5.
Figure 5B:
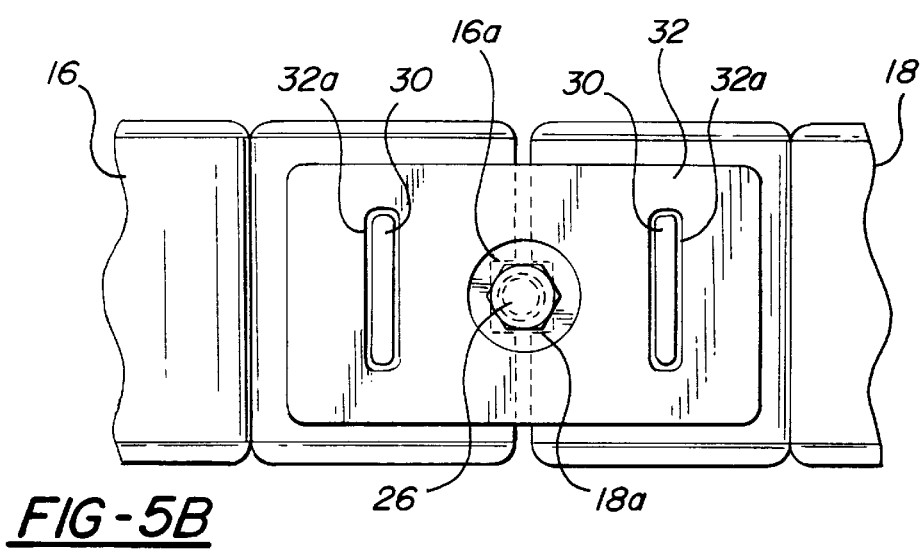

FIG. 5 illustrates a third embodiment of the invention, in which the connection established by a male throughpiece such as 20b (FIG. 3) or 26 (FIG. 4) is supplemented with integrally cast posts or tangs 30 formed on the outside circumference of the end cuffs in each cuff set, and with tang-receiving slots 32a formed in female adapter links 32. The slotted female adapter links 32 are placed over the abutting end cuffs in adjoining cuff sets 16, 18 over tangs 30, linked by the male throughpiece as described above, and then the tangs are welded to the female adapter links at 34. The embodiment of FIG. 5 provides additional strength to the connection between the mated cuff sets by establishing a connection directly where the surfaces of the adapter links engage the cuff sets, in particular at the "halfway point" 10a on the circumference of each cuff end. The embodiment of FIG. 5 also shows male throughpiece 26 as a fully-threaded bolt secured to female adapted links 32 with a nut 27.

By casting tangs 30 integrally with the cuff sets, the separate male throughpiece for linking the female adapters may be eliminated in certain applications. It will also be apparent to those skilled in the art that the modified, slotted female adapter link and welding tang arrangement of FIG. 5 can be used with or without a keyway formed by channels 16a, 18a in the end faces of the cuff sets.

Figure 6:
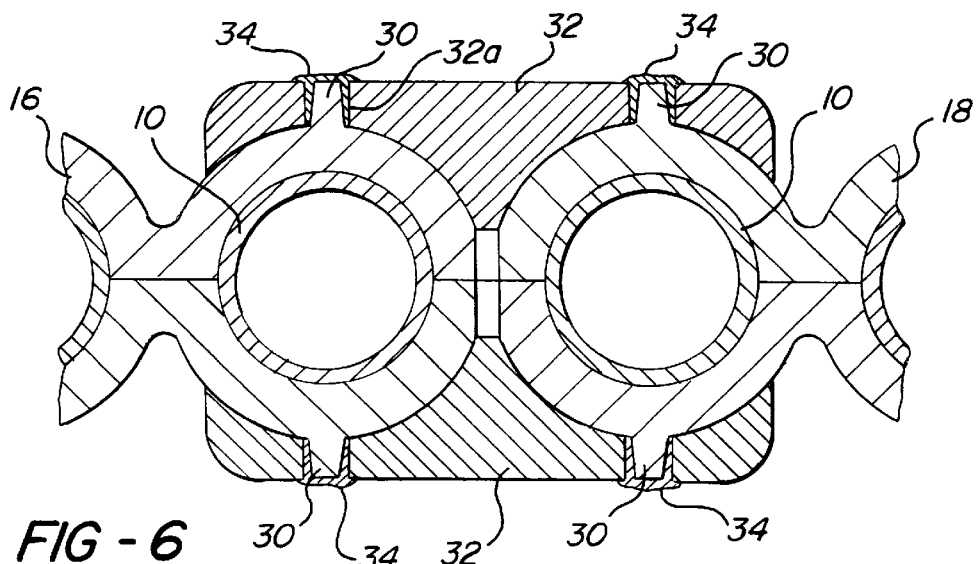
FIGS. 6–8 illustrate alternate arrangements of the welding structure shown in FIG. 5.
Figure 7:
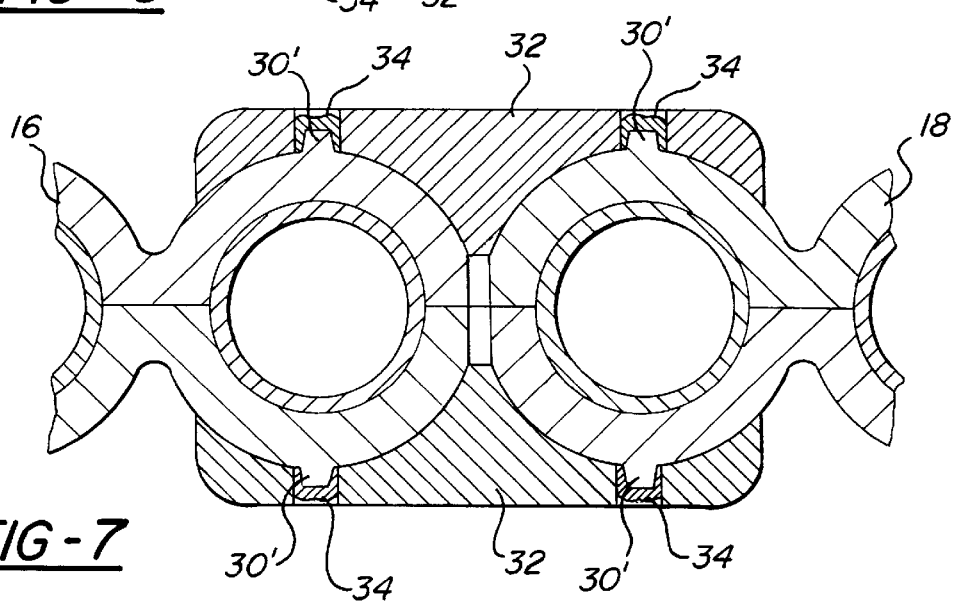
Figure 8:
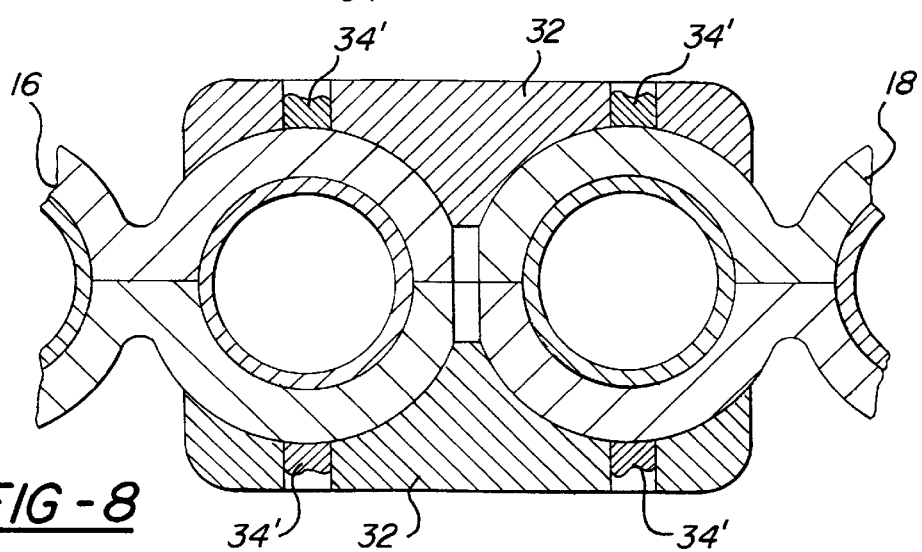

FIGS. 6–8 illustrate the tang and slot structure of FIG. 5 used without a male throughpiece. In FIG. 7, the cast welding tangs on the cuff sets are reduced in height so that their height is less than the thickness of female adapter links 32. The depth of slots 32a is accordingly greater than the height of tangs 30', with the result that weld 34 can be extended to completely cover the tangs and provide an even more secure connection.

Referring next to FIG. 8, another alternate embodiment of the linking structure in FIG. 5 is illustrated, in which two of the female adapter links 32 are secured by plug welds 34' directly to the outer surfaces of the end cuffs on cuff sets 16 and 18, without the assistance of welding tangs such as 30 or 30'. The direct-weld adapter link arrangement shown in FIG. 8 may be preferable under some circumstances, for example when used to link prior art-type cuff sets that do not have the benefit of integrally cast welding tangs 30 or the previously-described keyway which allows the use of a male throughpiece to link the female adapters. However, the arrangement of FIG. 8 is more likely to result in damage to the cuffs if the adapter links are "de-welded" and plug welds 34' removed for link or cuff replacement. The weldable tang portions 30 and 30' in FIGS. 6 and 7 allow the female adapter links 32 to be de-welded with a reduced risk of cuff damage.

Figure 9:
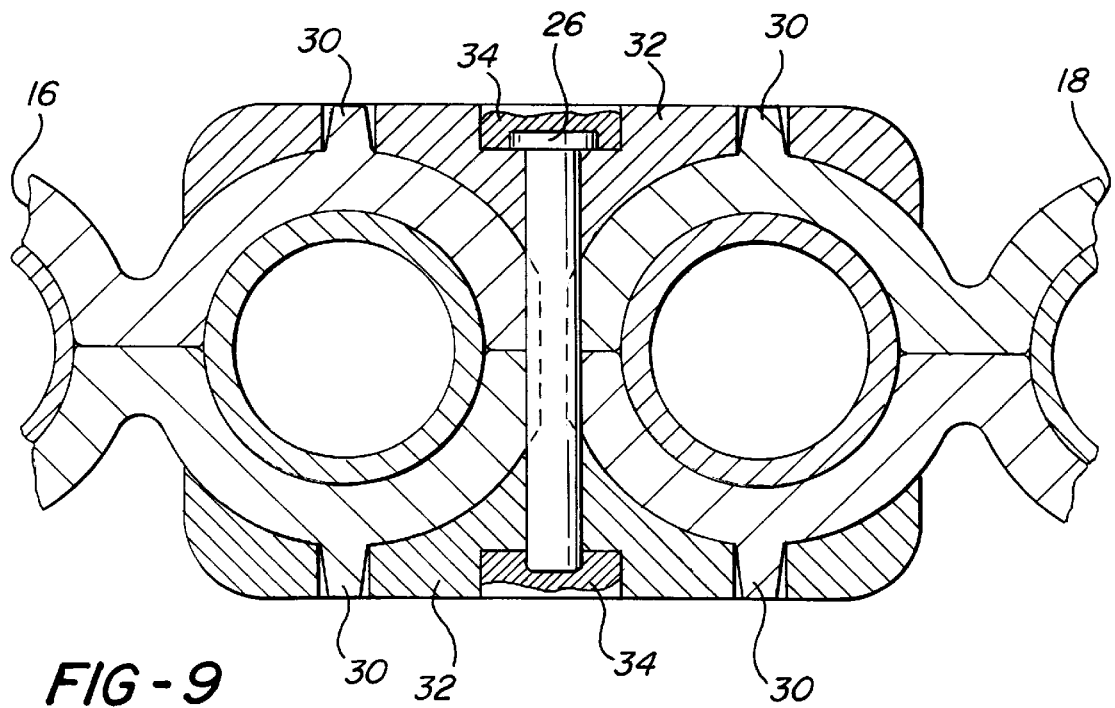
FIG. 9 illustrates an embodiment similar to FIG. 5, but with a non-threaded male throughpiece.
Figure 10:
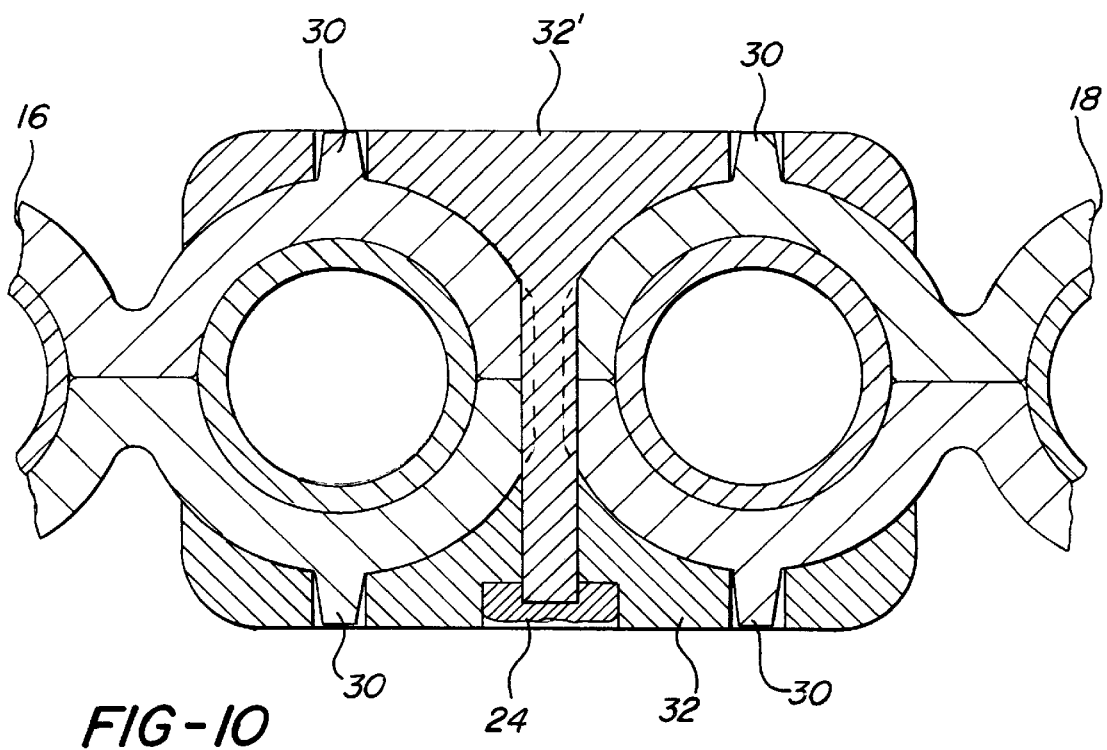
FIG. 10 illustrates a male/female adapter link set combining features of the embodiments shown in FIGS. 3 and 5.

It is also possible to use one of the embodiments of FIGS. 6 through 8 with a male through-piece, either formed integrally with one of the female adapter links to make it a "male" adapter link 32' as shown in FIG. 10, or as a separate male throughpiece 26 as shown in FIG. 9.

It be understood by those skilled in the art that while welding tangs 30 and mating slots 32 in the adapter links have been illustrated in the preferred form as elongated, generally rectangular forms, they may take different shapes and sizes.

While preferred forms of the illustrated embodiments of the invention have been shown in the described above, it will further be apparent to those skilled in the art that the invention can be modified without departing from the scope of the claims. For example, the dimensions and exact shape of the adapter links according to the present invention are likely to vary depending on the size, shape and type of cuff sets being joined. These and other application-dependent changes will lie within the scope of the invention as defined by the following claims.

Accordingly, we claim:

1. A system for linking adjacent sets of boiler tube cuffs, comprising:

a pair of cuff sets, each cuff set having a mating end adapted to be mated in endwise fashion to the mating end on the other cuff set, each mating end being provided with a keyway portion such that the mating ends define a keyway when mated;

a pair of adapter links, each link have a cuff-engaging surface contoured to conform to the outer surfaces of two endwise mated cuff portions associated with the keyway-provided mating ends of the pair of cuff sets; and, means for securing the pair of adapter links to the endwise mated cuff sets through the keyway to link the endwise mated cuff sets in alignment.

2. The system of claim 1, wherein the means for securing the pair of adapter links includes a male throughpiece extending radially from one adapter link in the pair to the other adapter link in the pair between the mated ends of the cuff sets through the keyway, the male throughpiece being secured at each end to one of the adapter links to radially lock the adapter links onto the cuff sets.

3. The system as defined in claim 2, wherein one of the adapter links is a male adapter link with an integral male throughpiece, and the other adapter link is a female adapter link with an aperture for receiving the male throughpiece therein.

4. The system as defined in claim 2, wherein each adapter link is a female adapter link having an aperture for receiving a separate male throughpiece therein.

5. The system as defined in claim 4, wherein the male throughpiece is a bolt.

6. A system for linking adjacent sets of boiler tube cuffs, comprising:

a pair of adapter links adapted to engage the outer surfaces of two endwise mated cuff portions of two cuff sets, each link have a cuff-engaging surface contoured to conform to the outer surfaces of the two endwise mated cuff portions; and, means adapted to secure the pair of adapter links to the endwise mated cuff sets to link the endwise mated cuff sets in alignment, comprising a slot extending through each adapter link corresponding to each endwise mated cuff portion of the cuff sets, the slot being designed to receive a weld therein.

7. A system for linking adjacent sets of boiler tube cuffs, comprising:

a pair of cuff sets; a pair of adapter links, each link have a cuff-engaging surface contoured to conform to the outer surfaces of two endwise mated cuff portions of the cuff sets; and, means for securing the pair of adapter links to the endwise mated cuff sets to link the endwise mated cuff sets in alignment, comprising a slot extending through each adapter link corresponding to each endwise mated cuff portion of the cuff sets, the slot being designed to receive a weld therein, wherein each endwise mated cuff portion includes an integral welding tang on the outer surface thereof, the tang being adapted to extend into the corresponding welding slot in an adapter link, such that the adapter link can be welded to the welding tang.

8. The system as defined in claim 7, wherein the welding tang is located on the outer surface of the cuff portion at the center of the cuff portion.

\* \* \* \* \*